(12) United States Patent
Ohkado

(10) Patent No.: US 6,542,165 B1
(45) Date of Patent: Apr. 1, 2003

(54) SYSTEM, APPARATUS AND METHOD OF RELATING ANNOTATION DATA TO AN APPLICATION WINDOW

(75) Inventor: Akira Ohkado, Yokohama (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/261,661

(22) Filed: Mar. 3, 1999

(30) Foreign Application Priority Data

Jul. 10, 1998 (JP) .......................................... 10-195485

(51) Int. Cl.$^7$ ................................................ G06F 3/00
(52) U.S. Cl. ........................ 345/751; 345/781; 707/512
(58) Field of Search ................................ 345/733, 751, 345/753, 759, 764, 768, 781, 788, 790, 791, 797, 802, 803, 804, 805; 707/512; 709/200, 204, 205, 329

(56) References Cited

U.S. PATENT DOCUMENTS

| | | | | |
|---|---|---|---|---|
| 5,530,795 A | * | 6/1996 | Wan ............................ | 345/332 |
| 5,577,188 A | * | 11/1996 | Zhu ............................. | 345/326 |
| 5,608,872 A | * | 3/1997 | Schwartz et al. ........... | 709/205 |
| 5,760,772 A | * | 6/1998 | Austin ......................... | 345/798 |
| 5,893,126 A | * | 4/1999 | Drews et al. ................ | 707/512 |
| 6,342,906 B1 | * | 1/2002 | Kumar et al. ............... | 345/751 |

FOREIGN PATENT DOCUMENTS

| | | |
|---|---|---|
| JP | 8-241276 | 9/1996 |
| JP | 9-101937 | 4/1997 |

OTHER PUBLICATIONS

Koichi Usunomiya et al., "Implementation of Group Editor with Existing Text Editors", *Transactions of Information Processing Society of Japan*, vol. 33, No. 9, Sep. 15, 1992.

Keitaro Horikawa et al., "Development of Shared Transparency Board System", *Image Processing Society of Japan Research Report*, vol. 94, No. 87, Oct. 14, 1994.

Yokosato Junichi et al., "A Study of a Hypermedia System Integrated Applications Using External Anchor Management", *Technical Report of IEICE*, vol. 96, No. 496, Jan. 24, 1997.

T. Gutekunst et al., "A Distributed and Policy–Free General Purpose Shared Window System", *IEEE/ACM Transactions on Networking*, vol. 3, No. 1, Feb. 1, 1995.

\* cited by examiner

*Primary Examiner*—Crescelle N. dela Torre
(74) *Attorney, Agent, or Firm*—Charles W. Peterson, Jr.; Louis J. Percello

(57) ABSTRACT

A system, apparatus and method for generating a transparent window on an application window designated by an operator. An annotation is drawn in the transparent window depending on the kind of message generated on the transparent window. The invention can be utilized in collaborating with another terminal located in a remote location. There are a scheme in which a window of an application to be collaborated and a transparent window corresponding thereto are started in the both systems and only the data such as an image drawn on the transparent window is transmitted to the collaborating system and another scheme in which an application to be collaborated is run only on one of the systems and an image merging the annotation data is transmitted to the other system.

16 Claims, 6 Drawing Sheets

SYSTEM, APPARATUS AND METHOD OF RELATING ANNOTATION DATA TO AN APPLICATION WINDOW

TECHNICAL FIELD

The present invention relates to a method of relating image data to an application window and more particularly to a method of allowing an operator to relate desired image data to an application window for displaying it.

BACKGROUND

As shown in FIG. 7, there exists in the art a collaboration technology which allows a plurality of persons in remote locations to share a same internet Web screen to co-operate each other (ContactFusion (trademark of International Business Machines Corporation), and PS FEEL Vol.32, pp 13–20, Future Electronic Environment Laboratory "PS FEEL" Editorial Room, June 1998, etc.)

However, this technology employs a method of taking in images of specific applications (Web browser) 123, 143 in both collaborating systems and merging them with annotation data 125, 145 to output them as an application window image. Therefore, this technology only allows existing Web data to be shared and can not dynamically share data and a display application depending on a collaborating party so that it was unable to satisfy user's demand to explain the method of using various applications.

SUMMARY OF THE INVENTION

Accordingly, it is an object of this invention to enable to directly write on a shared application by relating to an application which is a meaningful unit rather than a physical location on the screen;

It is another object of this invention to provide a system in which easy to understand annotation can be effected during collaboration while displaying the target application at a desired position on the screen;

It is a further object of this invention to provide a system in which easy to understand annotation can be effected during collaboration while displaying the target application in a desired size on the screen;

It is a further object of this invention to provide a user friendly system in which an annotation moves along the movement of an application;

It is a further object of this invention to provide a system which allows another application to be used in the middle of collaboration;

It is a further object of this invention to provide a system in which a load on a communication system is low;

It is a further object of this invention to provide a collaboration system which reduces unnecessary determination logics to enable a high speed processing;

It is a further object of this invention to provide a collaboration system which reduces resources required in execution.

The invention relates therefore to an application window designated by an operator, wherein a transparent window which is a child window of that application window is generated. A hook is then registered in the application window and a message generated in that area is detected. Then, depending on the kind of the massage, an annotation is drawn, an annotation is re-drawn as a result of the repair of the application window (and its descendant window), and the position and the size of the transparent window are adjusted in response to the change of the size or movement of the application window.

This invention may be also utilized in collaborating with another terminal located in a remote location. One mode of such utilization is a scheme of starting in the two collaborating systems an application window to be collaborated and a transparent window corresponding thereto, and transmitting only data on the transparent window, such as a graphical image drawn, to the collaborating system for re-generating the image in the transparent window on the collaborating system. Another mode is a scheme of running an application to be collaborated only on one of the systems and sending the image to the other terminal system.

In one aspect, this invention provide a method of relating annotation data to an application window executed on a display control apparatus which has a display screen and a pointing device for designating a position on said display screen, and is capable of displaying a plurality of application windows on said display screen, said method comprising;

(a) a step of specifying an application window in response to an operator input, (b) a step of generating a transparent window of which said specified application window is a parent window in a substantially same area as an area of said specified application window excluding the title bar and in front of said specified application window, (c) a step of monitoring an operator input on said transparent window, (d) a step of determining, when an operator input is generated on said transparent window, whether or not it is an event for generating annotation data in said transparent window, and (e) a step of generating annotation data responding to said operator input in said transparent window when it is determined that the operator input generated on said transparent window is an event to generate annotation data.

As used herein, the term "a transparent window" means a window including a transparent portion through which a window behind it can be recognized and is a concept including not only a uniformly transparent window but also a window having a grating or a grid.

In another aspect, this invention provide a method of relating annotation data to an application window executed on a display control apparatus which has an interface for communicating with another computer system, a display screen and a pointing device for designating a position on said display screen, and is capable of displaying a plurality of application windows on said display screen, said method comprising;

(a) a step of establishing a session with another computer system, (b) a step of generating a transparent window in front of an application window, (c) a step of sending information specifying the kind and the size of said application window to said another computer system, (d) a step of monitoring an operator input on said transparent window, (e) a step of generating annotation data responding to the operator input in said transparent window when an operator input is generated on said transparent window, and (f) a step of sending annotation data responding to said operator input to said another computer system when an operator input is generated on said transparent window.

In another aspect, this invention provide a method of relating annotation data to an application window executed on a display control apparatus which has an interface for communicating with another computer system, a display screen and a pointing device for designating a position on said display screen, and is capable of displaying a plurality of application windows on said display screen, said method comprising;

(a) a step of establishing a session with another computer system, (b) a step of generating a transparent window in front of an application window, (c) a step of monitoring an operator input on said transparent window, (d) a step of generating annotation data responding to the operator input in said transparent window when an operator input is generated on said transparent window, and (e) a step of sending image data of said application window and said annotation data to said another computer system when an operator input is generated on said transparent window.

In a further aspect, this invention provide a method of relating annotation data to an application window executed on a display control apparatus which has a display screen and a pointing device for designating a position on said display screen, and is capable of displaying a plurality of application windows on said display screen, said method comprising;

(a) a step of generating a transparent window in front of an application window, (b) a step of monitoring an operator input on said transparent window, and (c) a step of generating annotation data responding to the operator input in said transparent window when an operator input is generated on said transparent window.

In a further aspect, this invention provide a display control apparatus which has a display screen and a pointing device for designating a position on said display screen, and is capable of displaying a plurality of application windows on said display screen, comprising;

(a) a transparent window generated in a substantially same area as an area of a specified application window specified in response to an operator input excluding the title bar and in front of said specified application window, said specified application window being a parent window of said transparent window, (b) a window procedure for monitoring an operator input on said transparent window and for determining, when an operator input is generated on said transparent window, whether or not it is an event for generating annotation data in said transparent window, and (c) a drawing part for generating annotation data responding to said operator input in said transparent window when it is determined that the operator input generated on said transparent window is an event to generate annotation data.

In a further aspect, this invention provide a display control apparatus which has an interface for communicating with another computer system, a display screen and a pointing device for designating a position on said display screen, and is capable of displaying a plurality of application windows on said display screen, comprising;

(a) an interface for establishing a session with another computer system, (b) a transparent window generated in front of an application window, (c) a transmission control part for sending information specifying the kind and the size of said application window to said another computer system, (d) a window procedure for monitoring an operator input on said transparent window, and (e) a drawing part for generating annotation data responding to the operator input in said transparent window when an operator input is generated on said transparent window, said transmission control part sending annotation data responding to said operator input to said another computer system when an operator input is generated on said transparent window.

In a further aspect, this invention provide a display control apparatus which has an interface for communicating with another computer system, a display screen and a pointing device for designating a position on said display screen, and is capable of displaying a plurality of application windows on said display screen, comprising;

(a) an interface for establishing a session with another computer system, (b) a transparent window generated in front of an application window, (c) a window procedure for monitoring an operator input on said transparent window, (d) a drawing part for generating annotation data responding to the operator input in said transparent window when an operator input is generated on said transparent window, and (e) a transmission control part for sending image data of said application window and said annotation data to said another computer system when an operator input is generated on said transparent window.

In a further aspect, this invention provide a display control apparatus which has a display screen and a pointing device for designating a position on said display screen, and is capable of displaying a plurality of application windows on said display screen, comprising;

(a) a transparent window generated in front of an application window, (b) a window procedure for monitoring an operator input on said transparent window, and (c) a drawing part for generating annotation data responding to the operator input in said transparent window when an operator input is generated on said transparent window.

In a further aspect, this invention provide a system comprising a first and a second display control apparatus which has an interface for communicating with another computer system, a display screen and a pointing device for designating a position on said display screen, and is capable of displaying a plurality of application windows on said display screen, said system further comprising;

(a) a first display control apparatus including, (a-1) a first transparent window generated in front of a first application window, (a-2) a transmission control part for sending information specifying the kind and the size of said first application window to said another computer system, (a-3) a first window procedure for monitoring an operator input on said first transparent window, and (a-4) a first drawing part for generating annotation data responding to the operator input in said first transparent window when an operator input is generated on said first transparent window, (a-5) said transmission control part sending said annotation data responding to said operator input to said second display control apparatus when an operator input is generated on said first transparent window, (b) a second first display control apparatus including, (b-1) a second transparent window generated in front of an application window specified based on information which specifies the kind and the window size of the application window sent from said first display control apparatus, and (b-2) a second drawing part for drawing annotation data sent from said first display control apparatus on said second transparent window.

In a further aspect, this invention provide a system which sends annotation data responding to said operator input to said first display control apparatus, when an operator input is generated on said second transparent window.

In a further aspect, this invention provide a system comprising a first and a second display control apparatus which has an interface for communicating with another computer system, a display screen and a pointing device for designating a position on said display screen, and is capable of displaying a plurality of application windows on said display screen, said system further comprising;

(a) a first display control apparatus including, (a-1) a first transparent window generated in front of a first application window, (a-2) a first window procedure for monitoring an operator input on said first transparent window, and (a-3) a first drawing part for generating annotation data responding to the operator input in said first transparent window when an operator input is generated on said first transparent window, (a-4) a transmission control part for sending image data of said first application window and said annotation data to said operator input to said second display control apparatus when an operator input is generated on said first transparent window, and (b) a second display control apparatus for displaying image data of said first application window and said annotation data which are sent from said first display control apparatus.

In a further aspect, this invention provides a system in which said second display control apparatus displays image data of said first application window and said annotation data sent from said first display control apparatus as second application window and sends event information generated on said second application window to said first display control apparatus.

In a further aspect, this invention provide a recording medium storing a control program for relating annotation data to an application window which is executed on a display control apparatus which has a display screen and a pointing device for designating a position on said display screen, and is capable of displaying a plurality of application windows on said display screen, said control program comprising;

(a) a program code instructing said display control apparatus to specify an application window in response to an operator input, (b) a program code instructing said display control apparatus to generate a transparent window of which said specified application window as a parent window in a substantially same area as an area of said specified application window excluding the title bar and in front of said specified application window, (c) a program code instructing said display control apparatus to monitor an operator input on said transparent window, (d) a program code instructing said display control apparatus to determine, when an operator input is generated on said transparent window, whether or not it is an event for generating annotation data in said transparent window, and (e) a program code instructing said display control apparatus to generate annotation data responding to said operator input in said transparent window when it is determined that the operator input generated on said transparent window is an event to generate annotation data.

In a further aspect, this invention provide a recording medium storing a control program for relating annotation data to an application window which is executed on a display control apparatus which has an interface for communicating with another computer system, a display screen and a pointing device for designating a position on said display screen, and is capable of displaying a plurality of application windows on said display screen, said control program comprising;

(a) a program code instructing said display control apparatus to establish a session with another computer system, (b) a program code instructing said display control apparatus to generate a transparent window in front of an application window, (c) a program code instructing said display control apparatus to send information specifying the kind and the size of said application window to said another computer system, (d) a program code instructing said display control apparatus to monitor an operator input on said transparent window, (e) a program code instructing said display control apparatus to generate annotation data responding to the operator input in said transparent window when an operator input is generated on said transparent window, and (f) a program code instructing said display control apparatus to send annotation data responding to said operator input to said another computer system when an operator input is generated on said transparent window.

In a further aspect, this invention provide a recording medium storing a control program for relating annotation data to an application window which is executed on a display control apparatus which has an interface for communicating with another computer system, a display screen and a pointing device for designating a position on said display screen, and is capable of displaying a plurality of application windows on said display screen, said control program comprising;

(a) a program code instructing said display control apparatus to establish a session with another computer system, (b) a program code instructing said display control apparatus to generate a transparent window in front of an application window, (c) a program code instructing said display control apparatus to monitor an operator input on said transparent window, (d) a program code instructing said display control apparatus to generate annotation data responding to the operator input in said transparent window when an operator input is generated on said transparent window, and (e) a program code instructing said display control apparatus to send image data of said application window and said annotation data to said another computer system when an operator input is generated on said transparent window.

In a further aspect, this invention provide a recording medium storing a control program for relating annotation data to an application window which is executed on a display control apparatus which has a display screen and a pointing device for designating a position on said display screen, and is capable of displaying a plurality of application windows on said display screen, said control program comprising;

(a) a program code instructing said display control apparatus to generate a transparent window in front of an application window, (b) a program code instructing said display control apparatus to monitor an operator input on said transparent window, and (c) a program code instructing said display control apparatus to generate annotation data responding to the operator input in said transparent window when an operator input is generated on said transparent window.

BRIEF DESCRIPTION OF THE FIGURES

The objects, features and other characteristics of the invention will be more readily understood in conjunction with the accompanying drawings in which.

DESCRIPTION OF THE REFERENCE NUMBERS

Figure 1:
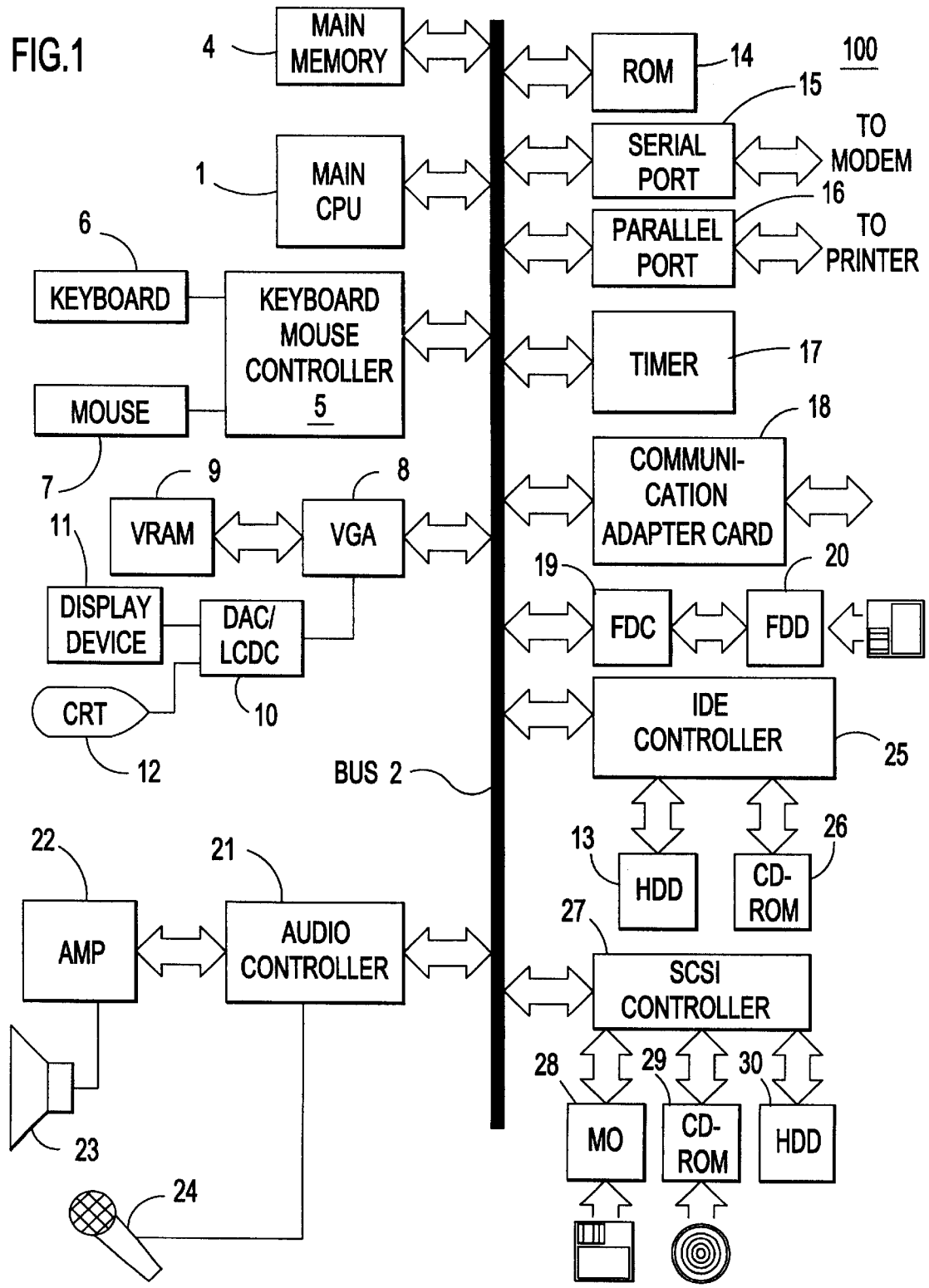
FIG. 1 is a block diagram showing a hardware configuration.

201: subject application
203: operating system
205: transparent window
207: window procedure
209: drawing part
211: drawing control part
213: hook
215: input/output control part
217: event determination part
219: size adjusting part
221: re-drawing control part
223: drawing parameter control part
225: display control part
231: interface
233: receiving control part
235: transmission control part

DETAILED DESCRIPTION OF THE INVENTION

A. Hardware Configuration

Referring now to the drawings, and more particularly, FIG. 1 is a schematic view of the hardware configuration for implementing the display control apparatus 100 of this invention. The display control apparatus 100 contains a central processing unit (CPU) 1 and a memory 4. The CPU 1 and the memory 4 are connected to a hard disk device 13, 30 as an auxiliary storage via a bus 2 and the like. A floppy disk device (or a medium drive device 26, 28, 29, such as MO 28, a CD-ROM 26, 29) 20 is connected to the bus 2 through a floppy disk controller (or various controllers such as IDE controller 25, SCSI controller 27) 19.

A floppy disk (or a recording medium such as an MO, a CD-ROM) is inserted to the floppy disk device (or a medium drive device 26, 28, 29, such as an MO, a CD-ROM) 20. A computer program code which gives instructions to the CPU and the like in cooperation with an operating system to practice this invention and various data are recorded in the floppy disk, the hard disk device 13, or a CD-ROM 14 and executed by being loaded in the memory 4. The computer program code may be compressed or divided into pieces for recording in a plurality of media.

Further, the display control apparatus 100 may be a system which is provided with a user interface hardware including, for example, a pointing device 7 (a mouse, a joystick, and a track ball, etc.) for inputting screen position information, a keyboard 6 for supporting a key input and displays 11, 12 for presenting image data to the user. Further, a speaker 23 receives a sound signal from an audio controller 21 via an amplifier 22 for outputting as a sound.

The display control apparatus 100 may communicate with other computers and the like via a serial port 15 and a modem, or communication adapter card 18 such as token ring.

This invention may be practiced by a conventional personal computer (PC), a workstation, a computer implemented in home electric appliances such as a television set or a facsimile equipment, and a combination thereof. It should be noted, however, that these components are given for exemplary purpose and it is not meant that all of these components are the indispensable components of this invention. Particularly, because this invention is intended for annotate on a window of an application, components such as the serial port 15, the communication adapter card 18, the audio controller 21, the amplifier 22 and the speaker 23 are not indispensable for one mode of practicing this invention.

While it is desirable that the operating system is one which support a GUI multi window environment as a standard component such as Windows (a trademark of Microsoft) and X-WINDOW system (a trademark of X Consortium) on AIX (a trademark of International Business Machines Corporation), the operating system is not limited to any specific operating system environment.

While FIG. 1 shows a system in a stand alone environment, this invention may be implemented as a client/server system in which a client machine may be connected via LAN (such as Ethernet or a token ring, etc.,) and the server machine side may be provided with drawing part and drawing control part to be described later with other functions disposed in the client machine side. As such, it is a matter of choice on design to dispose what function in the server machine side and the client machine side and various modifications including combination of multiple machines and allocation of functions to them for implementation are within the concept included in the spirit of this invention.

B. System Configuration

Figure 2:
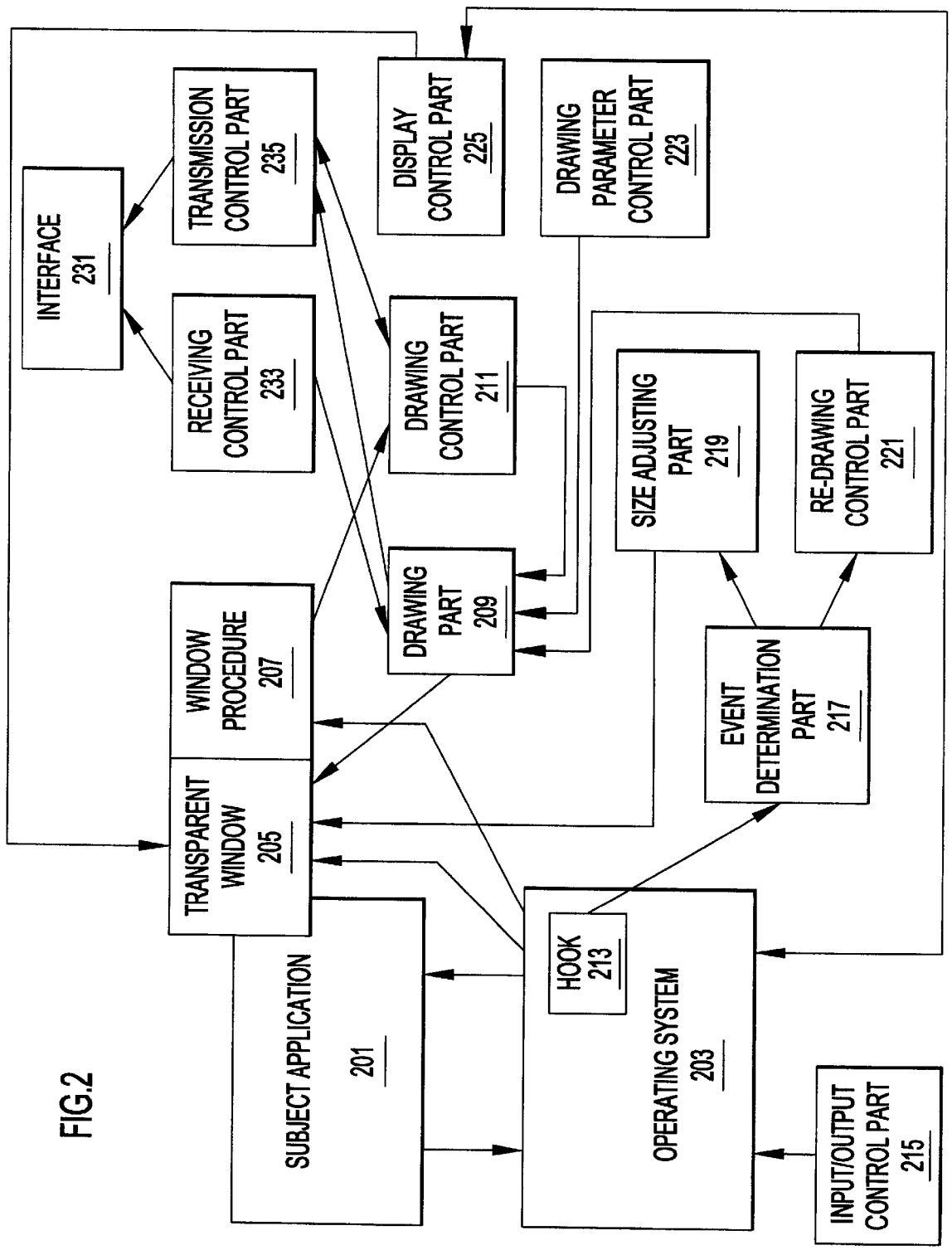
FIG. 2 is a block diagram of components.

With reference to the block diagram of FIG. 2, the system configuration of this invention is now described. In the preferred embodiment of this invention, the display control apparatus 100 comprises; a subject application 201, an operating system 203, a transparent window 205, a window procedure 207, a drawing part 209, a drawing control part 211, a hook 213, an input/output control part 215, an event determination part 217, a size adjusting part 219, a re-drawing control part 221, a display control part 225 and a drawing parameter 223.

The subject application 201 is an application which is a subject of annotation. The operating system 203 generates the transparent window 205 and the hook 213 to be described later, and interprets an inputted signal and direct it to a predetermined application as a window message.

The transparent window 205 displays the output of annotation data in response to an operator input. The window procedure 207 obtains a drawing event generated in the transparent window 205.

The drawing control part 211 interprets the drawing event which the window procedure 207 obtained and obtains coordinate change data and the like during a predetermined time period. The drawing part 209 generates annotation data (polylines, etc.) based on the coordinate change data interpreted by the drawing control part 211.

The hook 213 obtains an event generated on the window of the subject application. The input/output control part 215 controls a signal from a pointing device of a mouse and the like. The event determination part 217 interprets the content of the inputted event to determine the kind of the content.

The size adjusting part 219 adjusts the size of the transparent window 205 so as to fit the window size of the subject application 201. The re-drawing control part 221 provides a control to cause the transparent window 205 to be re-drawn after the subject application 201 is re-drawn.

The display control part 225 controls generation and extinguishment of the transparent window 205. The drawing parameter 223 controls the change of the drawing parameter. The interface 231 is an interface for communicating with another computer system.

The receiving control part 233 determines whether or not the obtained data is data including coordinates change data sent from another computer and delivers the coordinate change data to the drawing part 209 if it is the data including coordinate change data. The receiving control part 233 may be provided with a data compression/decompression function or a function to decrypt encrypted data.

The transmission control part 235 monitors whether or not annotation is done for every predetermined length of time and, if annotation is done, obtains drawing parameter information from the drawing part 209 and coordinate change data from the drawing control part 211, and send them to another computer. The transmission control part 235 may be provided with a data compression/decompression function or a function to decrypt encrypted data.

While the functional blocks shown in FIG. 2 have been described, they are logical functional blocks and it is not meant that they are implemented in the form of independent hardwares or softwares. They may be implemented by a complex or shared hardware or software.

C. Description of Operation

C-1. Generation of Transparent Window

Figure 3:
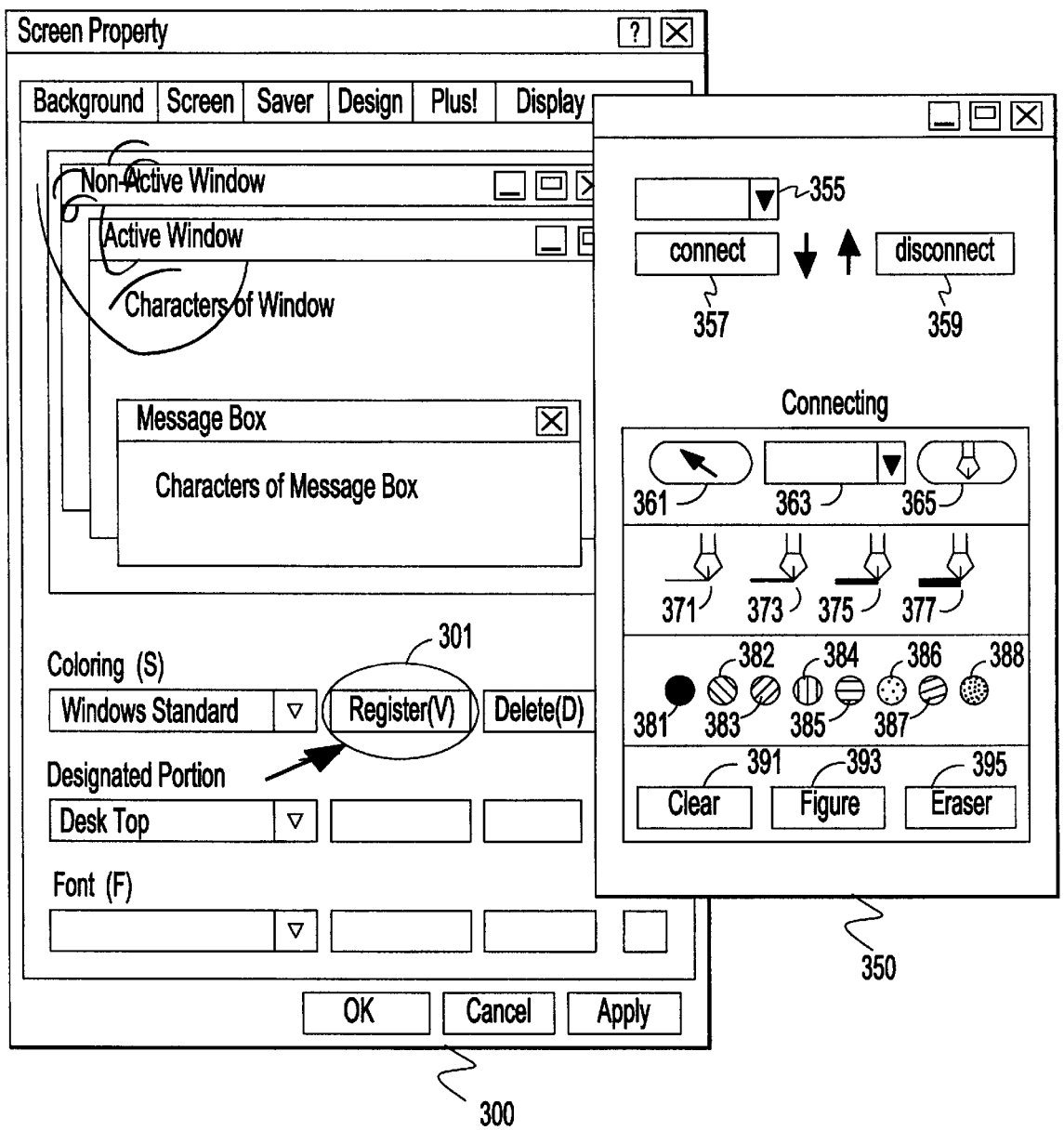
FIG. 3 is a diagram showing an example of a user interface in the preferred embodiment of this invention.

FIG. 3 is an example of a user interface in the preferred embodiment of this invention. The window 300 is an application window while the window 350 is an annotation control window.

In the preferred embodiment of this invention, the annotation control window 350 has a destination entry 355, a connection button 357, a disconnection button 359, an annotation end button 361, an annotation start button 365, line selection icons 371–377, color selection icons 381–388, a clear button 391, and a figure palette button 393 arranged therein.

The destination entry 355 is an entry to specify a destination of connection (such as destination address). The entry 355 may be specified not only by a keyboard input but also by selecting a pre-registered address in a pull down menu.

The connection button 357 is a button to start connection operation to a computer system specified in the destination entry. The disconnection button 359 is a button to disconnect a connection to another computer. The annotation end button 361 is a button to exit from annotation mode and erase the transparent window 205 and the like. The annotation start button 365 is a button to switch to the annotation mode to generate the transparent window and the like. In the preferred embodiment of this invention, when the annotation start button 365 is clicked, the mouse pointer changes into the shape of a pen while it returns to the original shape when the annotation end button 361 is clicked.

The line selection icons 371–377 are icons to specify the thickness of a line used. The color selection icons 381–388 are icons to specify the color of a line used in annotation.

The clear button 391 is a button to reset designation of an annotation control window currently designated to an initial state. The figure palette button 393 is a button to call an image palette (not shown). The operator can also designates a desired figure such as a rectangle and ellipse, etc., in the image palette to draw the figure in the transparent window.

The eraser icon 395 is a button to erase an annotation which has been already made. In the preferred embodiment of this invention, when the eraser icon is clicked, the mouse pointer changes to the shape of an eraser. The eraser mode is released by clicking the annotation start button 365, the line selection icons 371–377 or the figure palette.

In the preferred embodiment of this invention, the operator can select a desired application from the list of applications which are the candidates of collaboration (which has started, can be started or is pre-registered, etc.) by an application selection pull down window 363 to start a collaboration operation. When an annotation is needed during the collaboration operation, the operator clicks the annotation start button 365 while the operator clicks the annotation end button 361 when the annotation is not needed. As described previously, when the annotation start button 365 is clicked, the transparent window 205 of which the application window 201 is the parent. When the annotation end button 361 is clicked, the transparent window 205 terminates. In the preferred embodiment of this invention, because the mouse pointer changes to the shape of a pen only on the transparent window 205 while it runs, the operator can recognize that the transparent window 205 is formed on the application window 300 and also identify regions of the transparent window 205.

In another preferred embodiment of this invention, when the application selection button is clicked by the operator, the mouse pointer changes to an intelligent cursor of a special shape. The intelligent cursor includes a display instructing the operator to drop on an application for which a collaboration is desired. When the intelligent cursor is dropped on the application window 300, the message is notified to a collaboration function via the operating system to select the application window 201.

At this time, the display control part 225 obtains information of the window position and the window size of the subject application 201 (not including the title bar) from the operating system 203 to cause the position and the size of the transparent window 205 match the window of the subject application 201 and causes the transparent window 205 to be displayed on top (top in Z order, or foremost as seen from the user) in the child window of the subject application.

Further, the hook 213 is registered for the operating system 203 to set a state to monitor a message to the subject application. Also, for use in re-drawing to be described later, a timer function of the operating system 203 is set in the subject application.

C-2. Processing of Events

Figure 4:
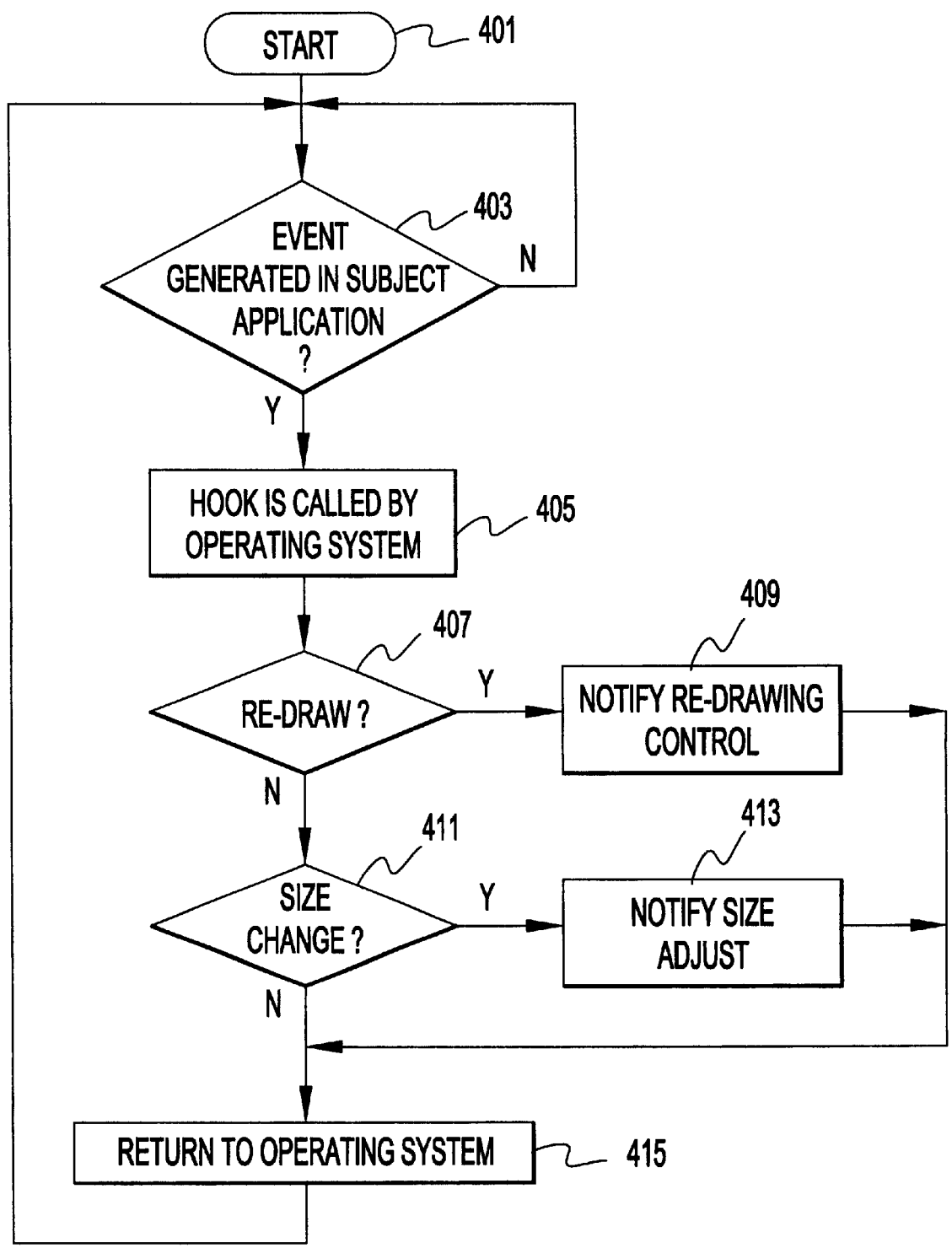
FIG. 4 is a diagram showing a procedure of processing an event in the preferred embodiment of this invention.

FIG. 4 is a diagram showing a processing procedure of an event in the preferred embodiment of this invention. When a drawing occurred or the size is changed in the subject application 201, a message is generated in the operating system 203 (block 403). The message is delivered to the subject application 201 again. At this time, the hook 213 obtains this message and delivers it to the event determination part 217 (block 405). The event determination part 217 determines whether or not this message is an event to be monitored (block 407). When the event determination part 217 determines that the content of the event is a drawing, it delivers the event to the re-drawing control part 221 (block 409). The event determination part 217 also delivers the event to the size adjusting part 219 when the content of the event is the change of the size (blocks 411, 413).

The re-drawing control part 221 which has received the event notifies the drawing part 209 that re-drawing the content of the transparent window 205 is needed. Re-drawing of the subject application 201 is done after returning from the hook 213 to the operating system 203 and after the message is delivered to the application 201. Therefore, the transparent window 205 is re-drawn after the application 201 is drawn by memorizing the state which requires re-drawing as a flag in the re-drawing control part 221 to cause the drawing part 209 to draw when a timer event of the operating system 203 is generated.

On the other hand, in the case of a size change, the size adjusting part 219 obtains new size information of the window of the subject application 201 from the operating system 203 to change the size of the transparent window 205. At this time, the transparent window 205 is set for display on top in the children window of the subject application 201.

Because the transparent window 205 is generated as a child window of the window of the subject application 201, the transparent window 205 itself is moved by the operating system when the window of the subject application is moved.

When the operator requests to draw (annotation) on the transparent window 205 by the pointing device, a message notifying an event from the input device is delivered to the window procedure 207 of the transparent window 205 by operating system 203. It is determined in the window procedure 207 that the event is an event to annotate and the window procedure 207 notifies the drawing control part 211 of the event. One example of determination of whether or not the event is an event to annotate is that an annotation is to start when the left button is depressed, the annotation is to end when the left button is released and the annotation is effected when moved while the left button is depressed in the case of a mouse.

The drawing control part 211 updates drawing data depending on the event. Specifically, the drawing control part interprets a drawing event (annotation event) which the window procedure obtained and obtains coordinate change data and the like for every period of time. When a line is drawn in free hand, the drawing part 209 generates annotation data (polylines) which is a set of very short line segment data based on the coordinate change data interpreted in the drawing control part 211. In the case of a predetermined figure data such as a rectangle, data for defining the graphical image such as coordinate values of 2 diagonal points is generated. The drawing part 209 updates or redraws data which is currently drawn based on the notification from the drawing control part 211 or the re-drawing control part 221.

C-3. Collaboration

Figure 5:
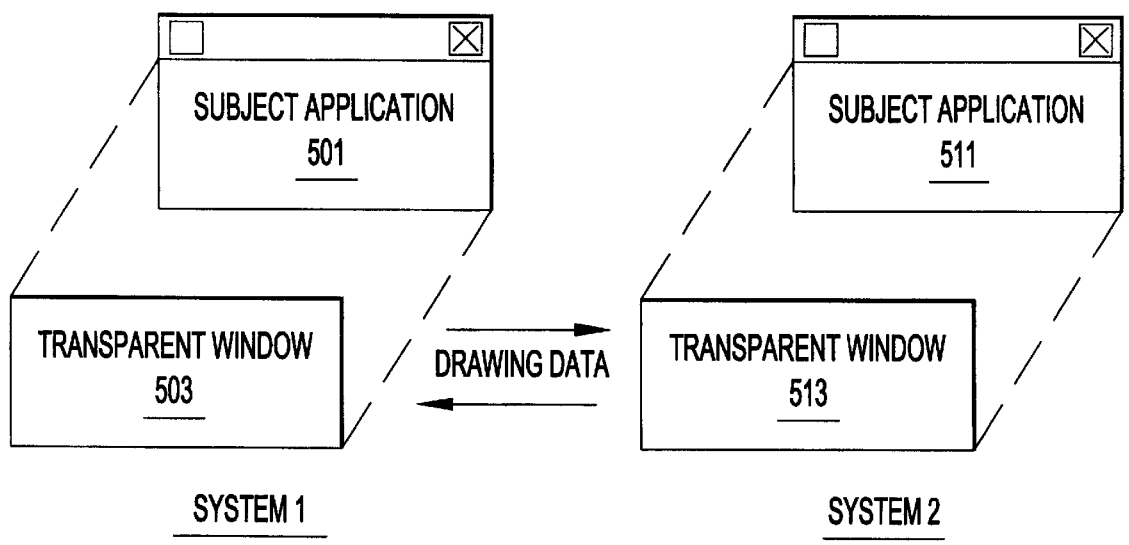
FIG. 5 is a diagram showing a scheme in which a transparent window in the preferred embodiment of this invention is used in the both systems collaborating each other.
Figure 6:
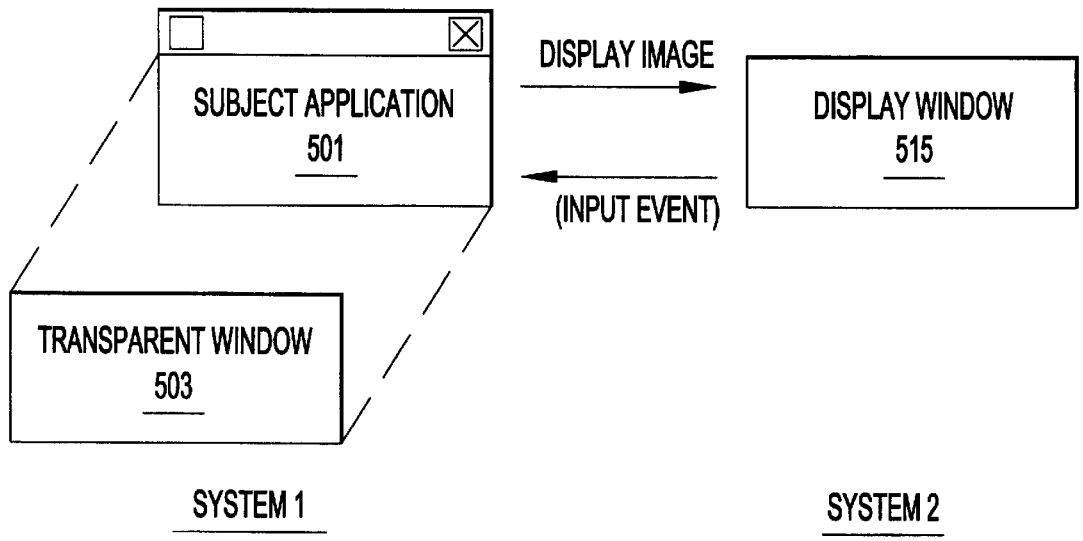
FIG. 6 is a diagram showing a mode of collaboration when the image transfer scheme in the preferred embodiment of this invention is employed.
Figure 7:
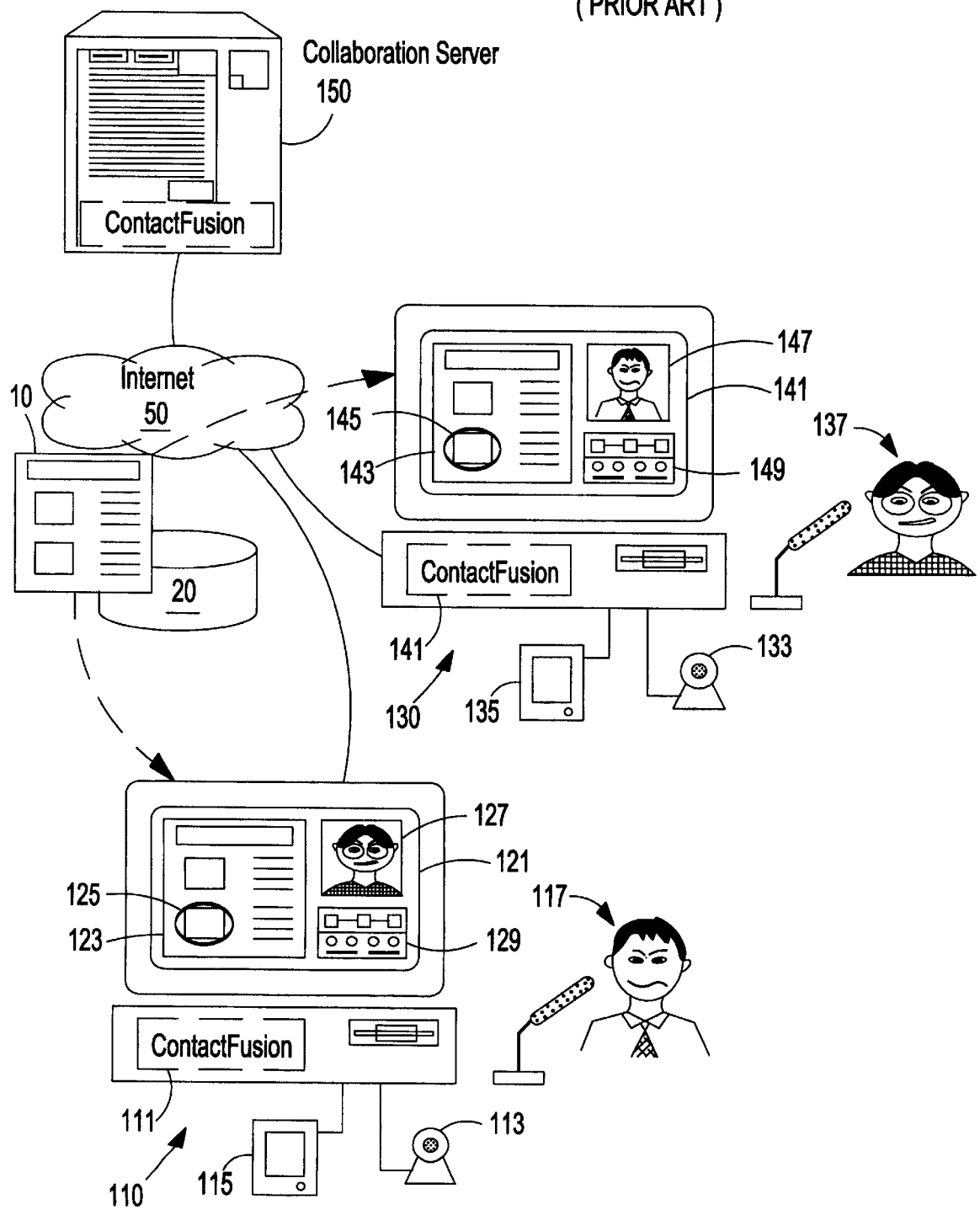
FIG. 7 is a diagram explaining a conventional collaboration system.

This invention can be utilized in collaborating with another terminal located in a remote location. One mode of such collaboration is a scheme of starting a window of an application to be collaborated and a corresponding transparent window in the collaborating systems, and transmitting only the data such as figure drawn on the transparent window to the collaborating system to develop the drawing on the transparent window of the collaborating system (FIG. 5). Another mode is a scheme of running an application to be collaborated only on one of the systems and transmitting the image to the other terminal system (FIG. 6).

C-3-1. Scheme of Using Transparent Windows in Both of the two Systems Collaborating Each Other In this scheme, the windows of the application 201 to be collaborated and files to be used are known to collaboration function in the both systems (for example by an operation in which a collaboration function starts an application).

Specifically, in FIG. 3, when the operator on the main station inputs an address of the destination of connection to the destination entry 355 and depresses the connection button 357, a session with the other computer is established (a session is not established if the other computer rejects connection). After the connection is established, a desired application can be selected from the list of applications which are the candidates of collaboration (which have been started, can be started or is pre-registered) in an application selection pull down window 363 in the main station to start a collaboration operation. At this time, the kind of the application, the file name used or to be used (a file which is accessible by both the main station and the other station, such as a file on a server) and the window size (position and size) are obtained in the main station side and transmitted to the other computer system.

The other computer system which obtains them checks to see whether or not the application and the file are available and starts the application in a designated window size when they are available. Information of the size change of the application window is monitored by the both sides and, when the event is generated, the other system is notified of this and changes the window size based on this to continuously keep synchronization of the window size. When the annotation start button 365 is clicked in either one of the computer systems, the transparent window 205 is generated in the application windows of the both systems and switches to the annotation mode.

In one mode of the preferred embodiment of this invention, when a corresponding application or file does not exist in the other station, the application and the file can be transmitted from the main station to the other computer system side.

Then, only annotation data drawn on the transparent window (data such as line segment/figure) is transmitted to the other system where the drawing is reproduced on the transparent window. Transmission may be either one way or two way. In the preferred embodiment of this invention, a mode can be set in which annotation is selectively inhibited in the other station while only the main station can perform the annotation.

When annotation is done in either station, only the figure data is transferred to the other station. The figure data is data for defining an annotation image such as the coordinate values of two diagonal points for a rectangle and coordinate values of successive point in drawing a line by a free hand. In this scheme, the receiving control part 233 of FIG. 2 monitors image data from the other computer system and delivers the image data to the drawing part 209 when it is obtained.

The transmission control part 235 monitors as to whether or not an annotation is done for every predetermined length of time and obtains drawing parameter information from the drawing part 209 and coordinate change data from the drawing control part 211 when an annotation is done to transmit them to the other computer. The transmission control part 235 may be provided with a data compression function or an encryption function.

C-3-2. Image Transfer Scheme

In this scheme, the application to be collaborated runs only on one of the systems while the user of the other system watches the image of that application. In this mode, an image displayed by an application is obtained in a system where the application runs and transmitted to the other system (typically with compression). While this scheme is less advantageous than "C-3-1. Scheme of using transparent windows in both of the two systems collaborating each other" in that the data amount to be transmitted increases, it is advantageous in that it is not necessary to run a same application (accessing to a same file) in two systems in synchronism and a collaboration (annotation) can be done in any application window. Therefore, it is possible to start a collaboration in a form of dropping a collaboration start icon (not shown) on a desired application rather than the form of the pull down menu 363 for selecting an application as shown in FIG. 3.

Specifically, the transmission control part 235 may be implemented such that it receives image data from the transparent window 205 and the subject application 201 and composes it into transmission data rather than receiving transmission data from the drawing part 209 or the drawing control part 211.

The other computer system displays the image in the display window as if the application runs there. When an event is generated in the display window in the other computer system, the generated event is obtained and transmitted to the system where the application runs. A bi-directional collaboration is then realized by having the application generate the event. If the event to the display window is not obtained, the collaboration would be unidirectional. In this scheme also, a mode can be set in which an annotation is inhibited in the other station while allowing the main station to perform annotation.

When using a transparent window in this mode, the following schemes are possible.

1) a scheme in which a transparent window is overlaid after a basic image is obtained and transferred and only the image data drawn in the transparent window is transferred to additively draw it in the image of the display window, and 2) a scheme in which a transparent window is overlaid on the subject application for drawing there and a final image including the drawing is obtained and transmitted (a compression scheme such as taking a difference as an image is used in this case).

EFFECT OF THE INVENTION

As described in the above, this invention can provide a user friendly annotation corresponding to an application while displaying an application being used in a desired screen position by relating it to an application which is a meaningful unit rather than a physical location on the screen.

While the present invention has been described in terms of preferred embodiments, various alterations and modifications will occur to those skilled in the art without departing from the scope and spirit of the invention. It is intended that the appended claims encompass all such variations and modifications.

I claim:

1. A method of relating annotation data to an application window executed on a display control apparatus which has a display screen and a pointing device for designating a position on said display screen, and is capable of displaying a plurality of application windows on said display screen, said method comprising:

(a) a step of specifying an application window in response to an operator input;

(b) a step of generating a transparent window of which said specified application window is a parent window in a substantially same area as an area of said specified application window excluding the title bar and in front of said specified application window;

(c) a step of monitoring an operator input on said transparent window;

(d) a step of determining, when an operator input is generated on said transparent window, whether or not it is an event for generating annotation data in said transparent window, said transparent window containing only annotations from operator input; and (e) a step of generating annotation data responding to said operator input in said transparent window when it is determined that the operator input generated on said transparent window is an event to generate annotation data.

2. A method of relating annotation data to an application window executed on a display control apparatus which has an interface for communicating with another computer system, a display screen and a pointing device for designating a position on said display screen, and is capable of displaying a plurality of application windows on said display screen, said method comprising:

(a) a step of establishing a session with another computer system;

(b) a step of generating a transparent child window in front of an application window;

(c) a step of sending information specifying the kind and the size of said application window to said another computer system;

(d) a step of monitoring an operator input on said transparent child window;

(e) a step of generating annotation data responding to the operator input in said transparent child window when an operator input is generated on said transparent child window, said transparent child window containing only annotations from operator input; and (f) a step of sending annotation data responding to said operator input to said another computer system when an operator input is generated on said transparent child window.

3. A method of relating annotation data to an application window executed on a display control apparatus which has an interface for commnunicating with another computer system, a display screen and a pointing device for designating a position on said display screen, and is capable of displaying a plurality of application windows on said display screen, said method comprising:

(a) a step of establishing a session with another computer system;

(b) a step of generating a transparent child window in front of an application window;

(c) a step of monitoring an operator input on said transparent child window;

(d) a step of generating annotation data responding to the operator input in said transparent child window when an operator input is generated on said transparent child window, said transparent child window containing only annotations from operator input; and (e) a step of sending image data of said application window and sending said annotation data to said another computer system when an operator input is generated on said transparent child window.

4. A method of relating annotation data to an application window executed on a display control apparatus which has a display screen and a pointing device for designating a position on said display screen, and is capable of displaying a plurality of application windows on said display screen, said method comprising:

(a) a step of generating a transparent child window in front of an application window;

(b) a step of monitoring an operator input on said transparent child window; and (c) a step of generating annotation data responding to the operator input in said transparent child window when an operator input is generated on said transparent child window, said transparent child window containing only annotations from operator input.

5. A display control apparatus which has a display screen and a pointing device for designating a position on said display screen, and is capable of displaying a plurality of application windows on said display screen, comprising:

(a) a transparent window generated in a substantially same area as an area of a specified application window specified in response to an operator input excluding the title bar and in front of said specified application window, said specified application window being a parent window of said transparent window;

(b) a window procedure for monitoring an operator input on said transparent window and for determining, when an operator input is generated on said transparent window, whether or not it is an event for generating annotation data in said transparent window; and (c) a drawing part for generating annotation data responding to said operator input in said transparent window when it is determined that the operator input generated on said transparent window is an event to generate annotation data, said transparent window containing only annotations from operator input.

6. A display control apparatus which has an interface for communicating with another computer system, a display screen and a pointing device for designating a position on said display screen, and is capable of displaying a plurality of application windows on said display screen, comprising:

(a) an interface for establishing a session with another computer system;

(b) a transparent child window generated in front of an application window;

(c) a transmission control part for sending information specifying the kind and the size of said application window to said another computer system;

(d) a window procedure for monitoring an operator input on said transparent child window; and (e) a drawing part for generating annotation data responding to the operator input in said transparent child window when an operator input is generated on said transparent child window, said transparent child window containing only annotations from operator input;

said transmission control part sending annotation data responding to said operator input to said another computer system when an operator input is generated on said transparent child window.

7. A display control apparatus which has an interface for communicating with another computer system, a display screen and a pointing device for designating a position on said display screen, and is capable of displaying a plurality of application windows on said display screen, comprising:

(a) an interface for establishing a session with another computer system;

(b) a transparent child window generated in front of an application window;

(c) a window procedure for monitoring an operator input on said transparent child window;

(d) a drawing part for generating annotation data responding to the operator input in said transparent child window when an operator input is generated on said transparent child window, said transparent child window containing only annotations from operator input; and (e) a transmission control part for sending image data of said application window and sending said annotation data to said another computer system when an operator input is generated on said transparent child window.

8. A display control apparatus which has a display screen and a pointing device for designating a position on said display screen, and is capable of displaying a plurality of application windows on said display screen, comprising:

(a) a transparent child window generated in front of an application window;

(b) a window procedure for monitoring an operator input on said parent child window; and (c) a drawing part for generating annotation data responding to the operator input in said transparent child window when an operator input is generated on said transparent child window, said transparent child window containing only annotations from operator input.

9. A system comprising a first and a second display control apparatus which has an interface for communicating with another computer system, a display screen and a pointing device for designating a position on said display screen, and is capable of displaying a plurality of application windows on said display screen, said system further comprising:

(a) a first display control apparatus including:
(a-1) a first transparent child window generated in front of a first application window, (a-2) a transmission control part for sending information specifying the kind and the size of said first application window to said another computer system, (a-3) a first window procedure for monitoring an operator input on said first transparent child window, and (a-4) a first drawing part for generating annotation data responding to the operator input in said first transparent child window when an operator input is generated on said first transparent child window, (a-5) said transmission control part sending annotation data responding to said operator input to said second display control apparatus when an operator input is generated on said first transparent child window; and (b) a second display control apparatus including:

(b-1) a second transparent child window generated in front of an application window specified based on information which specifies the kind and the window size of the application window sent from said first display control apparatus, and (b-2) a second drawing part for drawing annotation data sent from said first display control apparatus on said second transparent child window, each of said first transparent child window and said second transparent child window containing only annotations from operator input.

10. A system of claim 9 in which said second display control apparatus sends annotation data to said first display control apparatus responsive to operator input on said second transparent child window.

11. A system comprising a first and a second display control apparatus which has an interface for communicating with another computer system, a display screen and a pointing device for designating a position on said display screen, and is capable of displaying a plurality of application windows on said display screen, said system further comprising:

(a) a first display control apparatus including:

(a-1) a first transparent child window generated in front of a first application window, (a-2) a first window procedure for monitoring an operator input on said first transparent child window, (a-3) a first drawing part for generating annotation data responding to the operator input in said, fist transparent child window when an operator input is generated on said first transparent child window, and (a-4) a transmission control part for sending image data of said application window and sending said annotation data to said second display control apparatus when an operator input is generated on said first transparent child window, said transparent child window containing only annotations from operator input; and (b) a second display control apparatus for displaying image data of said first application window and said annotation data which are sent from said first display control apparatus.

12. A system of claim 11 in which said second display control apparatus displays image data of said first application window and said annotation data sent from said first display control apparatus and sends event information generated on said second display control apparatus to said first display control apparatus.

13. A recording medium storing a control program for relating annotation data to an application window which is executed on a display control apparatus which has a display screen and a pointing device for designating a position on said display screen, and is capable of displaying a plurality of application windows on said display screen, said control program comprising:

(a) a program code instructing said display control apparatus to specify an application window in response to an operator input;

(b) a program code instructing said display control apparatus to generate a transparent window of which said specified application window is a parent window in a substantially same area as an area of said specified application window excluding the title bar and in front of said specified application window;

(c) a program code instructing said display control apparatus to monitor an operator input on said transparent window;

(d) a program code instructing said display control apparatus to determine, whether an operator input on said transparent window is an event for generating annotation data in said transparent window; and (e) a program code instructing said display control apparatus to generate annotation data in said transparent window responsive to a determination that the operator input generated on said transparent window is an event to generate annotation data, said transparent window containing only annotations from operator input.

14. A recording medium storing a control program for relating annotation data to an application window which is executed on a display control apparatus which has an interface for communicating with another computer system, a display screen and a pointing device for designating a position on said display screen, and is capable of displaying a plurality of application windows on said display screen, said control program comprising:

(a) a program code instructing said display control apparatus to establish a session with another computer system;

(b) a program code instructing said display control apparatus to generate a transparent child window in front of an application window;

(c) a program code instructing said display control apparatus to send information specifying the kind and the size of said application window to said another computer system;

(d) a program code instructing said display control apparatus to monitor operator input on said transparent child window;

(e) a program code instructing said display control apparatus to generate annotation data in said transparent child window responsive to operator input on said transparent child window, said transparent child window containing only annotations from operator input; and (f) a program code instructing said display control apparatus to send said generated annotation data to said another computer system when an operator input is generated on said transparent child window.

15. A recording medium storing a control program for relating annotation data to an application window which is executed on a display control apparatus which has an interface for communicating with another computer system, a display screen and a pointing device for designating a position on said display screen, and is capable of displaying a plurality of application windows on said display screen, said control program comprising:

(a) a program code instructing said display control apparatus to establish a session with another computer system;

(b) a program code instructing said display control apparatus to generate a transparent child window in front of an application window;

(c) a program code instructing said display control apparatus to monitor operator input on said transparent child window;

(d) a program code instructing said display control apparatus to generate annotation data in said transparent child window responsive to operator input on said transparent child window, said transparent child window containing only annotations from operator input; and (e) a program code instructing said display control apparatus to send image data of said application window and send said annotation data to said another computer system responsive to operator input on said transparent child window.

16. A recording medium storing a control program for relating annotation data to an application window which is executed on a display control apparatus which has a display screen and a pointing device for designating a position on said display screen, and is capable of displaying a plurality of application windows on said display screen, said control program comprising:

(a) a program code instructing said display control apparatus to generate a transparent child window in front of an application window;

(b) a program code instructing said display control apparatus to monitor operator input on said transparent child window; and (c) a program code instructing said display control apparatus to generate annotation data in said transparent child window responsive to operator input on said transparent child window, said transparent child window containing only annotations from operator input.

* * * * *

UNITED STATES PATENT AND TRADEMARK OFFICE
CERTIFICATE OF CORRECTION

PATENT NO. : 6,542,165 B1
DATED : April 1, 2003
INVENTOR(S) : Akira Ohkado

It is certified that error appears in the above-identified patent and that said Letters Patent is hereby corrected as shown below:

Column 16,
Line 51, "said parent child" and insert -- said transparent child --.

Column 17,
Line 44, delete "said, first" and insert -- said first --.

Signed and Sealed this

Twenty-sixth Day of August, 2003

JAMES E. ROGAN
*Director of the United States Patent and Trademark Office*